United States Patent [19]
Molezzi et al.

[11] Patent Number: 5,615,831
[45] Date of Patent: Apr. 1, 1997

[54] STEAM PRECIPITATION JET

[75] Inventors: Michael J. Molezzi, Schenectady, N.Y.; Harry W. Crumbacher, New Harmony, Ind.; Bernard McConville; Connie H. Shannon, both of Evansville, Ind.

[73] Assignee: General Electric Company, Schenectady, N.Y.

[21] Appl. No.: 461,798

[22] Filed: Jun. 5, 1995

[51] Int. Cl.$^6$ ........................................... B05B 7/12
[52] U.S. Cl. ...................... 239/8; 239/417; 239/424.5; 239/432
[58] Field of Search ............................ 239/425, 432, 239/416.1, 417, 416.4, 416.5, 424.5, 434.5, 8, 310

[56] References Cited

U.S. PATENT DOCUMENTS

| | | | |
|---|---|---|---|
| 2,532,851 | 12/1950 | Meyer | 239/425 X |
| 3,508,339 | 4/1970 | Neblett et al. | 34/10 |
| 3,836,076 | 9/1974 | Conrad et al. | 239/432 X |
| 3,918,647 | 11/1975 | Lamz et al. | 239/432 X |
| 3,972,150 | 8/1976 | Hart | 239/424.5 X |
| 4,212,967 | 7/1980 | Govoni et al. | 528/500 |
| 4,213,936 | 7/1980 | Lodrick | 239/432 X |

FOREIGN PATENT DOCUMENTS

| | | | |
|---|---|---|---|
| 2421679 | 12/1979 | France | 239/425 |
| 1607968 | 11/1990 | U.S.S.R. | 239/425 |

*Primary Examiner*—Kevin Weldon
*Attorney, Agent, or Firm*—Marvin Snyder

[57] ABSTRACT

A precipitation jet includes a nozzle having an inlet for receiving liquid resin solution, a conical tip, and a plurality of circumferentially spaced apart outlets extending through the nozzle tip for discharging the resin solution. A tubular receiver is disposed coaxially with the nozzle tip and is spaced axially therefrom. The receiver includes a frustoconical impingement surface spaced axially from the nozzle tip to define therewith an annular flow channel having at opposite ends thereof a channel inlet for receiving steam and a channel outlet for discharging an atomized spray of the steam and resin solution for precipitating resin powder from the spray.

15 Claims, 2 Drawing Sheets

STEAM PRECIPITATION JET

BACKGROUND OF THE INVENTION

The present invention relates generally to steam precipitation for producing resin powder from liquid resin solution, and, more specifically, to a jet assembly for mixing the steam and resin solution to produce an atomized spray from which the resin powder is precipitated.

Steam precipitation is a common process of producing solid resin powder, such as polycarbonate, by introducing a liquid resin solution, such as polycarbonate in methylene chloride ($MeCl_2$) solvent, into steam which subsequently vaporizes the solvent to isolate the solid resin or polycarbonate in powder form. The process typically injects resin solution containing 10% to 30% polycarbonate by weight into high speed steam in a component known as a jet to produce a spray. The evaporation of the solvent from the spray precipitates solid granular polycarbonate powder which is conventionally recovered in a downstream precipitation piping loop.

Steam usage in the precipitation process is a significant cost factor and the efficiency of steam use may be evaluated by calculating a steam-to-resin ratio (S/R ratio) which is defined as the ratio of steam mass flow rate to the mass flow rate of the resin itself. Lower values of the S/R ratio indicate better steam efficiency. The operating S/R ratio in current precipitation jets typically varies from about 1.6 to more than 2.2 depending on process conditions and resin grade. The minimum operating S/R ratio is limited by the onset of undesirable powder properties such as large powder particles or agglomerated chunks thereof, and/or plugging of the precipitation jet and downstream equipment. Other factors in evaluating precipitation jet performance include the ability to operate efficiently over a range of resin solution flow rates, and optimization of the resulting resin powder properties including bulk density, handling characteristics, and powder size for example.

In one conventional precipitation jet, a plurality of cylindrical barrels are circumferentially spaced apart and feed a common annular impingement cone which in turn communicates with a common tubular throat and diffuser extending downstream therefrom. Each of the barrels includes a convergent inlet for injecting the steam axially into the barrel and a separate inlet for the resin solution which is injected immediately downstream of the steam inlet.

In operation, the spray from the steam and resin solution inlets flows axially downstream through the individual barrels and then flows radially inwardly along the impingement cone and in turn to the common throat and is discharged from the jet into a conventional precipitation piping loop from the diffuser. Resin films form in the individual barrels, on the impingement cone, and around the downstream throat which allows for greater opportunity for film buildup or solidification resulting in degraded performance. As the resin flow rate increases, undesirable plugs of partially precipitated resin tend to form within the barrels themselves. These plugs are ejected as large chunks or grow out of the barrel to form larger plugs in the impingement cone and downstream tubing. Preferentially higher resin flow may exist in some barrels due to small dimension discrepancies which tend to plug some barrels before others and therefore limit resin flow rate and steam efficiency. The fixed geometry of the precipitation jets requires steam supply pressure changes to effect steam flow control. However, changes in supply pressure alter steam temperature and velocity to the jet which are important factors in atomization and precipitation of the resin solution which in turn effects complex performance behavior of the jet.

SUMMARY OF THE INVENTION

A precipitation jet includes a nozzle having an inlet for receiving liquid resin solution, a conical tip, and a plurality of circumferentially spaced apart outlets extending through the nozzle tip for discharging the resin solution. A tubular receiver is disposed coaxially with the nozzle tip and is spaced axially therefrom. The receiver includes a frustoconical impingement surface spaced axially from the nozzle tip to define therewith an annular flow channel having at opposite ends thereof a channel inlet for receiving steam and a channel outlet for discharging an atomized spray of the steam and resin solution for precipitating resin powder from the spray.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
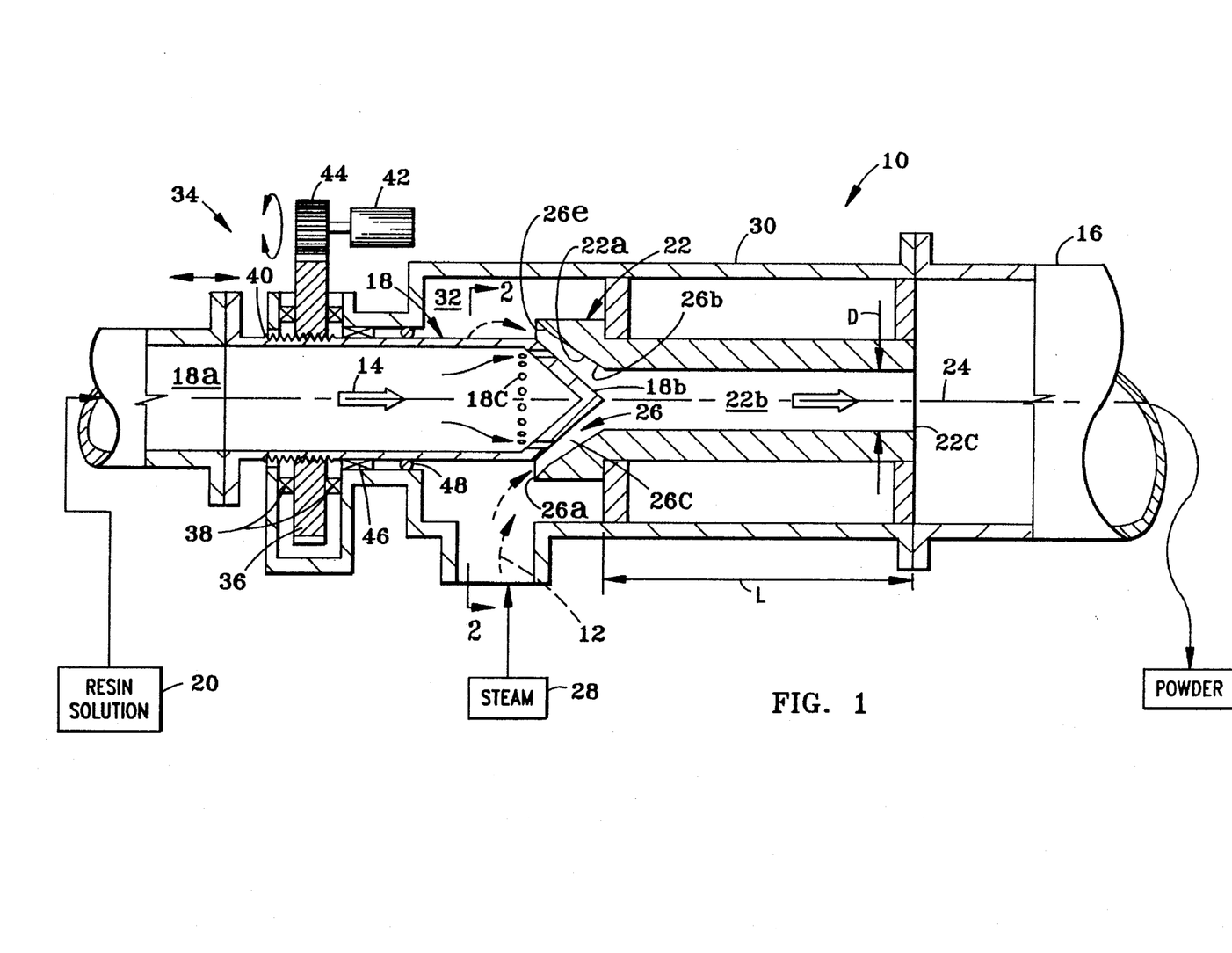
FIG. 1 is schematic representation, partly in section, of a steam precipitation jet in accordance with one embodiment of the present invention for atomizing a liquid resin solution for precipitating powder therefrom.

Illustrated in FIG. 1 is an exemplary embodiment of a precipitation jet or nozzle assembly 10 in accordance with the present invention for mixing a suitable gas 12 such as steam with a conventional liquid resin solution 14 for precipitating resin powder therefrom. The resin solution 14 may take any suitable form including for example polycarbonate in a methylene chloride ($MeCl_2$) solvent which may contain from about 10% to about 30% polycarbonate by weight. By suitably injecting the resin solution 14 and the high speed steam 12 an atomized spray is created, with the methylene chloride solvent vaporizing therefrom for precipitating solid granular polycarbonate resin powder which is conventionally recovered from a downstream heated precipitation piping loop 16.

The jet 10 includes a tubular or cylindrical nozzle 18 having a nozzle inlet 18a at a proximal end thereof for receiving the liquid resin solution 14 from conventional means 20 for supplying the liquid resin solution which typically includes a suitable pump and resin solution reservoir for injecting the solution into the nozzle inlet 18a at suitably high pressures in the range of about 100–400 psig for example. The nozzle 18 further includes a conical tip 18b at a distal or downstream end thereof. A plurality of circumferentially spaced apart nozzle outlets 18c in the form of cylindrical holes for example extend axially through the nozzle tip 18b for discharging or injecting the resin solution therefrom.

An annular or tubular receiver 22 is disposed coaxially with the nozzle tip 18b about a common axial centerline axis 24 of the jet 10 and is spaced axially downstream from the nozzle tip 18b. The receiver 22 includes at an upstream or forward end thereof a frustoconical impingement face or surface 22a which is spaced axially downstream or aft from the outer surface of the nozzle tip 18b to define therewith an annular or conical flow channel 26 having an annular channel inlet 26a at an upstream or forward end thereof of maximum diameter of the conical flow channel 26. The channel inlet 26a is disposed in flow communication with conventional means 28 for supplying the steam 12 under a suitably high pressure up to about 160 psig for example. The flow channel 26 has at an opposite or downstream end, which is the smallest diameter thereof, an annular channel outlet 26b for discharging a developing atomized spray of the steam 12 and resin solution 14, which resin solution 14 is injected into the flow channel 26 from the nozzle outlet 18c. The resin solution 14 initially forms a film along the impingement surface 22a, with the high speed steam 12 increasingly atomizing the resin solution film. The hot steam 12 also vaporizes the solvent in the resin solution 14 for precipitating solid granular resin powder therefrom which is conventionally recovered in the precipitation loop 16 extending from the downstream end of the jet 10.

The receiver 22 further includes a single cylindrical tube or barrel 22b extending downstream from the channel outlet 26b and coaxially with the nozzle 18 for receiving and channeling the resin solution film along its inner surface, with the high velocity steam 12 passing therethrough to continue atomizing the film. A single outlet 22c of the barrel or receiver is disposed at the aft or downstream end of the barrel 22b for discharging the atomized spray into the precipitation loop 16.

The basic jet 10 illustrated in FIG. 1 provides a simplified flow design for improving the introduction of both the steam 12 and resin solution 14 for effecting improved control of impingement of the resin solution and improved control of the velocity of the steam and vaporized solvent for improving efficiency and performance in precipitating the resin powder. The jet 10 provides various improvements over free atomization precipitation jets wherein steam and resin solution are mixed in the open, as well as improvements over the multi-barrel embodiment discussed in the Background section. For example, both the steam 12 and the resin solution 14 are immediately introduced into the flow channel 26 defined between the impingement surface 22a and the nozzle tip 18b for providing effective atomization and precipitation of resin powder with improved efficiency.

In the preferred embodiment illustrated in FIG. 1, the nozzle outlets 18c are disposed in the nozzle tip 18b axially between the channel inlet 26a and the channel outlet 26b, and the flow channel 26 includes a diverging portion 26c which preferably gradually increases in flow area from the nozzle outlets 18c to the channel outlet 26b. The increase in area is preferred for accommodating the flow area occupied by the injected resin solution 14 and the evaporation of the solvent therefrom for maintaining as high a velocity as possible of the steam or solvent vapor for maintaining improved efficiency of operation. As the developing spray flows downstream from the common axial plane of the nozzle outlets 18c, evaporation of the solvent increases which in turn increases the fraction of the solvent in its vapor phase. The increasing flow area of the flow channel 26 in its downstream direction accommodates the increasing fraction of the solvent vapor for maintaining high velocity and efficiency of operation. The spray then enters the heated precipitation loop 16 wherein evaporation of solvent from the spray continues and steam condensate formed from the evaporation of the solvent is revaporized and conventionally removed with the solvent for producing the powder resin.

Figure 2:
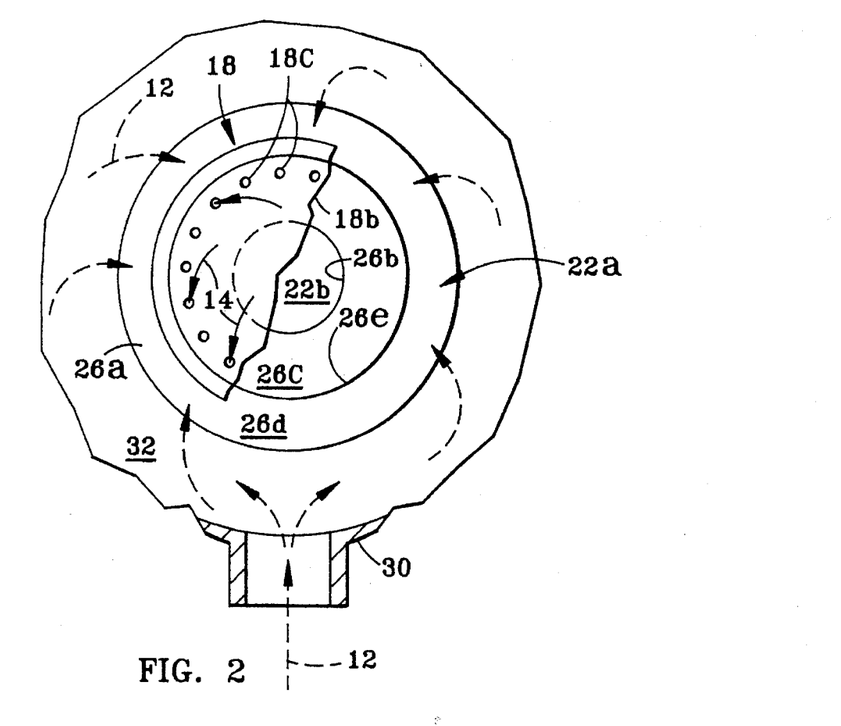
FIG. 2 is a sectional view through a portion of the precipitation jet illustrated in FIG. 1 and taken along line 2—2 showing portions of a nozzle for injecting the liquid resin solution into one end of a tubular receiver which also receives the steam.
Figure 3:
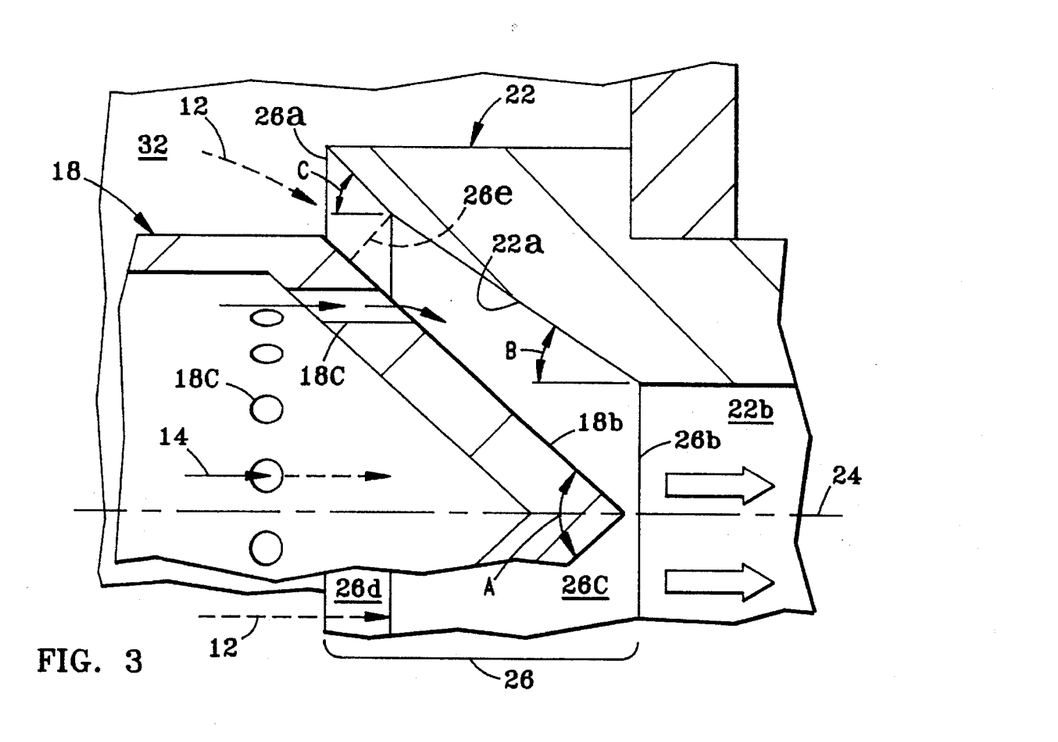
FIG. 3 is an enlarged sectional view of a portion of the adjoining nozzle and receiver illustrated in FIG. 1.

The juncture of the nozzle tip 18b and the upstream end of the receiver 22 is illustrated in more particularity in FIGS. 2 and 3. In order to maximize the velocity of the injected steam 12, the flow channel 26 further includes a converging portion 26d joined to the diverging portion 26c at a steam gap or throat 26e of minimum flow area between the outer surface of the nozzle tip 18b and the opposing impingement surface 22a. The converging portion decreases in flow area to the throat 26e for accelerating the steam 12 to a maximum velocity, and the diverging portion 26c increases in flow area downstream from the throat 26e. In the preferred embodiment, the throat 26e is disposed closely upstream of the aft ends of the nozzle outlets 18c for maximizing velocity of the steam 12 just prior to introduction of the resin solution 14 injected into the flow channel 26 at the nozzle outlets 18c.

The arrangement of the nozzle tip 18b inside the upstream end of the receiver 22 provides a simple and efficient configuration for commencing atomization of the resin solution 14 by the steam 12 with immediate impingement of the resin solution 14 against the impingement surface 22a to form a film for subsequent atomization and to effect desirable morphology of the resulting resin powder. The steam 12 and resin solution 14 are separately injected into the common upstream end of the flow channel 26 at its converging portion 26d. The impingement surface 22a allows a film of the resin solution 14 to initially form thereon and then be atomized by the injected steam 12. The developing spray is then channeled radially inwardly and axially aft in the flow channel 26 while the flow area therefor is increased by the diverging portion 26c which helps maintain maximum velocity to increase efficiency.

Referring again to FIGS. 1 and 2, the steam 12 from the steam supply may be channeled into the channel inlet 26a in any suitable manner. In the preferred embodiment illustrated in FIG. 1, a tubular housing 30 surrounds at least the downstream end of the nozzle 18 as well as the entire receiver 22, and is spaced in part radially outwardly therefrom to define an inlet plenum 32 which extends circumferentially around the channel inlet 26a for first receiving the steam 12 from the steam supply 28 and in turn channeling the steam 12 axially into the channel inlet 26a. The steam supply 28 therefore channels the steam 12 through a suitable housing inlet into the inlet plenum 32 for flow in turn into the channel inlet 26a.

In the preferred embodiment of the invention illustrated in FIG. 1, the jet 10 is specifically configured for obtaining choked flow of maximum sonic velocity (Mach No.=1) at one of the throat 26e and the barrel outlet 22c. For example, the barrel 22b preferably has a predetermined constant inner diameter D and a predetermined axial length L. The diameter D and streamwise length L affect maximum jet flow capacity since design flow is limited by choking of the steam and solvent vapor at the fixed diameter barrel outlet 22c. Increased barrel length L allows a longer region to atomize resin film therein, but effects a greater solvent vapor mass fraction at the barrel outlet 22c. The result is reduced steam capacity, lower velocity thorugh the barrel 22b, increased sensitivity of performance to flow rate changes, and reduced operating flow rate flexibility. Decreased barrel length L shortens the region available to atomize resin film, but gives greater flow rate flexibility due to increased steam capacity and velocity through the barrel 22b. Accordingly, both the diameter D and barrel length L are chosen to optimize performance at the desired operating condition for each specific design application.

Furthermore, the steam supply 28 is preferably effective for providing the steam 12 at a predetermined supply pressure at the channel inlet 26a for obtaining choked flow at the channel throat 26e. Similarly, the resin solution supply 20 is also preferably effective to supply the resin solution at a predetermined flow rate through the nozzle outlets 18c, and the channel throat 26e also has a predetermined flow area. These predetermined parameters of barrel diameter D and length L, steam supply pressure, resin solution flow rate, and throat flow area are collectively selected for obtaining choked flow at either of the throat 26a or the barrel outlet 22c.

The operation of the jet 10 is based on matching the throat flow area, barrel diameter, and flow rates to maintain high vapor phase velocity both at the throat 26e and throughout the barrel 22b. This is done by appropriate choice of barrel diameter D in the design of a jet for a particular flow rate range, and then by appropriate adjustment of the throat flow area and resin solution flow rate during operation. At low resin solution flow rates and small throat areas, the vapor phase flow is choked at the throat 26e with a sufficiently large barrel flow area relative to the throat flow area and low solvent vapor phase content to keep the vapor phase velocity less than the local choked velocity at the barrel outlet 22c. As the throat flow area is increased and/or the resin solution flow rate is increased, the vapor phase flow becomes choked at the barrel outlet 22c, which in turn limits the flow rate of steam through the jet 10. This unchokes the flow at the throat 26e, reducing steam velocity at that point. The point at which this transition from choked flow at the throat 26e to choked flow at the barrel outlet 22 occurs varies with resin solution flow rate and barrel diameter D. It is preferred that the jet 10 be operated at conditions as near as possible to the transition point in order to maintain maximum vapor phase velocity throughout the jet 10 for enhancing the ability to atomize the resin solution and avoid plugging of the jet 10.

Various trials using various forms of the jet 10 have been conducted for evaluating performance of the jet 10 based on several parameters. Parameters studied include barrel length L, barrel diameter D, exit geometry of the barrel, steam gap dimensions defining the throat 26e, and dimensions of the nozzle outlets 18c for injecting the resin solution. The trials were also conducted at various S/R ratios down to about 1.05 to show effective operation of the jet 10 without undesirable powder morphology due to failure to properly atomize. The tested S/R ratios down to about 1.05 are substantially lower than known S/R ratios currently available in prior art jets. Accordingly, steam usage efficiency may be greatly increased using the present invention. The ideal minimum S/R ratio for typical process conditions is estimated at about 0.8, with the jet 10 in accordance with the present invention being capable of closely reaching this value with the 1.05 ratio for example. The trials also included demonstration of continuous operation for more than four hours, along with the capacity to successfully operate with several polycarbonate resins, including branched, low molecular weight, high molecular weight, high heat, and high flow grades. As a result of these trials, it is also preferred that the housing 30 surrounding the receiver 22 be uncooled or characterized by the absence of means for cooling the receiver 22 so that the resin solution film created along the inner surface of the receiver 22 is maintained above the local glassification temperature to reduce the tendency for solidification and plugging. The heating of the receiver 22 by the hot steam 12 is desirable for maintaining effective operation of the jet 10. The temperature of the receiver 22 may be otherwise controlled for further enhancing performance of the jet 10 if desired.

Referring to FIG. 3, one preferred embodiment of the invention includes a nozzle tip 18b having a cone angle A of about 90°. The impingement surface 22a preferably has a cone half angle B of about 30°, which is a cone angle of about 60°, for the diverging channel portion 26c. The impingement surface 22a also has a cone half angle C of about 60°, which is a cone angle of 120°, for the converging channel portion 26d.

In a preferred embodiment of the invention, the nozzle outlets 18c are cylindrical holes extending axially parallel to each other and parallel to the axial centerline axis 24. And, as shown in FIG. 1, the outlet 22c of the barrel 22b is preferably blunt or flat for discharging the spray into the preferably larger diameter precipitation loop 16. In an alternate embodiment, the barrel outlet 22c may be tapered and diverge outwardly for providing a gradual transition to the larger diameter precipitation loop 16.

Various barrel lengths L are usable depending upon specific design factors, with the length L ranging in various tested embodiments from 1.5 inches to 37.5 inches, and with the preferred embodiment being 21.5 inches with the barrel diameter D of 1.75 inches.

Although the jet 10 illustrated in FIG. 1 may be configured with predetermined dimensions and flow rates for a specific production process, the jet 10 may also be simply made adjustable for improving its performance if desired. Since the conical flow channel 26 is the major structural and functional element of the jet, its geometry may be easily changed by providing suitable means 34 for selectively adjusting or varying, by axially translating at least one of the nozzle 18 and the receiver 22, the flow area of the throat 26e. Since the nozzle 18 and the receiver 22 are disposed coaxially with each other to define the flow channel 26 therebetween, either the nozzle 18 may be translated relative to the receiver 22 as illustrated in FIG. 1, or the receiver 22 may be translated relative to the nozzle 18 (not shown).

The exemplary adjusting means 34 illustrated in FIG. 1 includes a bull gear 36 suitably mounted to the forward end of the housing 30 between a pair of conventional thrust bearings 38. The bull gear 36 has an internally threaded bore which threadingly engages external threads 40 disposed around an intermediate portion of the outer surface of the nozzle 18. A conventional positioning motor 42 is operatively joined to a pinion gear 44 which engages the bull gear 36. By selectively rotating the pinion gear 44, the bull gear 36 is caused to rotate in turn which will in turn cause the threads 40 to axially translate the nozzle 18 forward or aft as desired to increase or decrease, respectively the spacing between the nozzle tip 18b and the receiver 22. In this way, the flow channel area of the throat 26e may be selectively varied by axially translating the nozzle tip 18b. A conventional linear bearing or bushing 46 is disposed between the outer surface of the nozzle 18 and a portion of the housing 30 to allow the nozzle 18 to accurately translate axially. A suitable seal 48, such as one or more O-ring seals, is also provided between the housing 30 and the outer surface of the nozzle 18 adjacent to the linear bearing 46 to seal steam leakage from the inlet plenum 32.

Accordingly, the ability to selectively adjust the flow area of the channel throat 26e by translating the nozzle 18 provides a significant parameter to optimize or tune operation of the jet 10 during operation for controlling efficiency of operation. Since the size of the throat 26e is variable, the pressure of the steam 12 from the steam supply 28 may remain fixed, with steam flow control being instead provided by simple flow area changes of the throat 26e as desired. Furthermore, the adjustable throat 26e allows control of steam mass flow while maintaining constant supply pressure and velocity at the point of resin solution injection for any operating condition. The annular flow channel 26 provides a single or common flow path for receiving both the steam 12 and resin solution 14 which allows the resulting resin solution film and steam to be distributed uniformly around the impingement surface 22a of the receiver 22. The flow channel 26 provides a uniform annulus for flow of the resin solution film and steam therethrough and may be effected by suitable accurate coaxial alignment of the nozzle 18 and the receiver 22. This may be done by accurate machining of these components and the corresponding supporting structure. If desired, suitable centering screws or adjustable bearings contacting the nozzle 18 may be provided for adjusting the radial location of the nozzle tip 18b relative to the impingement surface 22a for adjustment if desired.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A jet for atomizing a liquid resin solution with a gas for precipitating resin powder therefrom comprising:

a nozzle having an inlet for receiving said liquid resin solution, a conical tip at a distal end thereof, and a plurality of circumferentially spaced apart outlets extending through said nozzle tip for discharging said resin solution;

a tubular receiver disposed coaxially with said nozzle tip and spaced axially therefrom, said receiver including a frustoconical impingement surface spaced axially from said nozzle tip to define therewith an annular flow channel having at opposite ends thereof a channel inlet for receiving said gas and a channel outlet for discharging an atomized spray of said gas and said resin solution injected into said flow channel from said nozzle outlet for precipitating said resin powder from said spray;

said receiver further comprises a cylindrical barrel extending from said channel outlet and coaxially with said nozzle for channeling said spray therethrough;

said nozzle outlets are disposed in said nozzle tip axially between said channel inlet and said channel outlet; and said flow channel includes a diverging portion increasing in flow area from said nozzle outlets to said channel outlet.

2. A jet according to claim 1 wherein said flow channel further includes a converging portion joined to said diverging portion at a throat of minimum flow area, with said converging portion decreasing in flow area to said throat for accelerating said gas, and said diverging portion increasing in flow area therefrom.

3. A jet according to claim 2 wherein said throat is disposed upstream of said nozzle outlets for maximizing velocity of said gas prior to atomizing said resin solution injected into said flow channel at said nozzle outlets.

4. A jet according to claim 3 further comprising a housing surrounding at least part of said nozzle and said receiver, and spaced in part radially outwardly therefrom to define an inlet plenum around said channel inlet for receiving said gas and in turn channeling said gas into said channel inlet.

5. A jet according to claim 4 in combination with:

means for supplying said gas into said inlet plenum;

means for supplying said liquid resin solution into said nozzle inlet; and a precipitation loop disposed in flow communication with an outlet of said barrel for receiving said spray therefrom to form said resin powder.

6. A jet combination according to claim 5 wherein:

said barrel has a predetermined inner diameter and a predetermined axial length;

said gas supplying means are effective to supply said gas at a predetermined pressure at said channel inlet;

said resin solution supplying means are effective to supply said resin solution at a predetermined flow rate through said nozzle outlets; and said throat has a predetermined flow area.

7. A jet combination according to claim 5 wherein said gas is steam and said liquid resin solution is polycarbonate in methylene chloride solvent, and said resin powder is solid granular polycarbonate.

8. A jet combination according to claim 7 wherein said means for supplying said steam and said liquid resin solution are effective for producing a steam-to-resin ratio down to about 1.05 with effective operation of said jet.

9. A jet according to claim 4 wherein said nozzle outlets extend axially parallel to each other.

10. A jet according to claim 4 wherein said barrel includes a blunt outlet for discharging said spray into a precipitation loop.

11. A jet according to claim 4 wherein:

said nozzle tip has a cone angle of about 90°; and said impingement surface has a cone angle of about 60° at said diverging channel portion, and a cone angle of about 120° at said converging channel portion.

12. A jet according to claim 4 further comprising means for selectively adjusting, by axially translating at least one of said nozzle and said receiver, said flow area of said throat.

13. A jet according to claim 12 wherein said adjusting means are effective to coaxially translate said nozzle relative to said receiver.

14. A method for atomizing a liquid resin solution with a gas for precipitating resin powder therefrom comprising:

separately injecting said gas and said resin solution into one end of a conical flow channel defined between a conical impingement surface and a coaxial conical nozzle tip spaced axially therefrom for atomizing resin solution to form a developing spray; and channeling said developing spray radially inwardly in said flow channel while increasing flow area therefor.

15. A method according to claim 14 further comprising, channeling said developing spray downstream from said conical flow channel with a substantially constant flow area for a predetermined length.

* * * * *

UNITED STATES PATENT AND TRADEMARK OFFICE
CERTIFICATE OF CORRECTION

PATENT NO. : 5,615,831

DATED : April 1, 1997

INVENTOR(S) : Michael J. Malezzi, et. al.

It is certified that error appears in the above-identified patent and that said Letters Patent is hereby corrected as shown below:

The Title page should be deleted and substitute therefor the attached Title page.

Figure 1 of the drawings should be replaced by Figure 1 as shown on the attached pages, wherein the reference designation 26b is applied to the channel outlet and nozzle outlets 18C are moved to the right so as to align with the openings of the two outlets shown in longitudinal cross-section. The same correction should be made in the figure on the face the patent, which is a reproduction of Figure 1.

Figure 3 of the drawings should be replaced by Figure 3 as shown on the attached pages, wherein nozzle outlets 18C are moved to the right so as to align with the opening of the outlet shown in longitudinal cross-section.

In column 4, line 63, spelling of the word "through" is corrected.

Signed and Sealed this

Seventh Day of July, 1998

*Attest:*

BRUCE LEHMAN

*Attesting Officer*   Commissioner of Patents and Trademarks

United States Patent [19]

Molezzi et al.

[11] Patent Number: 5,615,831
[45] Date of Patent: Apr. 1, 1997

[54] STEAM PRECIPITATION JET

[75] Inventors: Michael J. Molezzi, Schenectady, N.Y.; Harry W. Crumbacher, New Harmony, Ind.; Bernard McConville; Connie H. Shannon, both of Evansville, Ind.

[73] Assignee: General Electric Company, Schenectady, N.Y.

[21] Appl. No.: 461,798

[22] Filed: Jun. 5, 1995

[51] Int. Cl.⁶ .................................................. B05B 7/12
[52] U.S. Cl. ..................... 239/8; 239/417; 239/424.5; 239/432
[58] Field of Search ......................... 239/425, 432, 239/416.1, 417, 416.4, 416.5, 424.5, 434.5, 8, 310

[56] References Cited

U.S. PATENT DOCUMENTS

| 2,532,851 | 12/1950 | Meyer | 239/425 X |
|---|---|---|---|
| 3,508,339 | 4/1970 | Neblett et al. | 34/10 |
| 3,836,076 | 9/1974 | Conrad et al. | 239/432 X |
| 3,918,647 | 11/1975 | Lamz et al. | 239/432 X |
| 3,972,150 | 8/1976 | Hart | 239/424.5 X |
| 4,212,967 | 7/1980 | Govoni et al. | 528/500 |
| 4,213,936 | 7/1980 | Lodrick | 239/432 X |

FOREIGN PATENT DOCUMENTS

| 2421679 | 12/1979 | France | 239/425 |
| 1607968 | 11/1990 | U.S.S.R. | 239/425 |

*Primary Examiner*—Kevin Weldon
*Attorney, Agent, or Firm*—Marvin Snyder

[57] ABSTRACT

A precipitation jet includes a nozzle having an inlet for receiving liquid resin solution, a conical tip, and a plurality of circumferentially spaced apart outlets extending through the nozzle tip for discharging the resin solution. A tubular receiver is disposed coaxially with the nozzle tip and is spaced axially therefrom. The receiver includes a frusto-conical impingement surface spaced axially from the nozzle tip to define therewith an annular flow channel having at opposite ends thereof a channel inlet for receiving steam and a channel outlet for discharging an atomized spray of the steam and resin solution for precipitating resin powder from the spray.

15 Claims, 2 Drawing Sheets